United States Patent [19]

Ulbing

[11] 4,406,067
[45] Sep. 27, 1983

[54] CENTERFINDING MACHINE

[75] Inventor: Otmar Ulbing, Fairport, N.Y.

[73] Assignee: USM Corporation, Farmington, Conn.

[21] Appl. No.: 427,160

[22] Filed: Sep. 29, 1982

[51] Int. Cl.³ .............................................. G01B 5/25
[52] U.S. Cl. ................................ 33/172 D; 33/149 R; 33/178 R; 33/178 D; 33/180 R
[58] Field of Search ................ 33/191, 180 R, 181 R, 33/286, 178 R, 178 D, 174 Q, 172 D, 174 P, 149 R

[56] References Cited

U.S. PATENT DOCUMENTS

| 1,614,005 | 1/1927 | Lewis | 33/178 D |
| 2,468,395 | 4/1949 | Fredin | 33/185 R |
| 2,807,879 | 10/1957 | Hardley | 33/191 |
| 3,065,577 | 11/1962 | Harris, Jr. | 33/178 R |
| 4,176,461 | 12/1979 | Gebel et al. | 33/178 D |

*Primary Examiner*—Willis Little
*Attorney, Agent, or Firm*—Vincent A. White

[57] ABSTRACT

A gage for locating the center of circular workpieces including a primary probe engageable with the periphery of a workpiece along a radial plane, a secondary probe spaced from the primary probe and swingable about a pivot axis coaxial with the engagement point of the primary probe, and a gage surface assuming a particular angular relation to the plane depending on the extent of the swinging movement of the secondary probe, the angular disposition of the gage surface being indicative of the distance between the periphery and the center of the workpiece.

7 Claims, 7 Drawing Figures

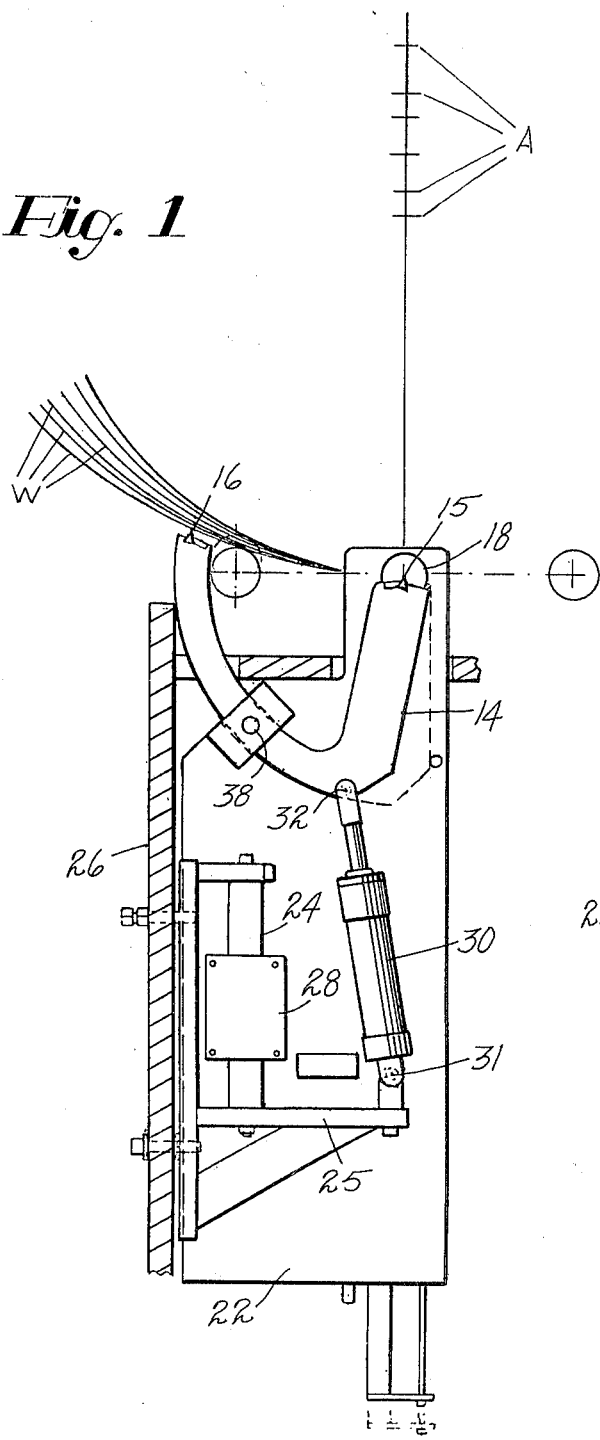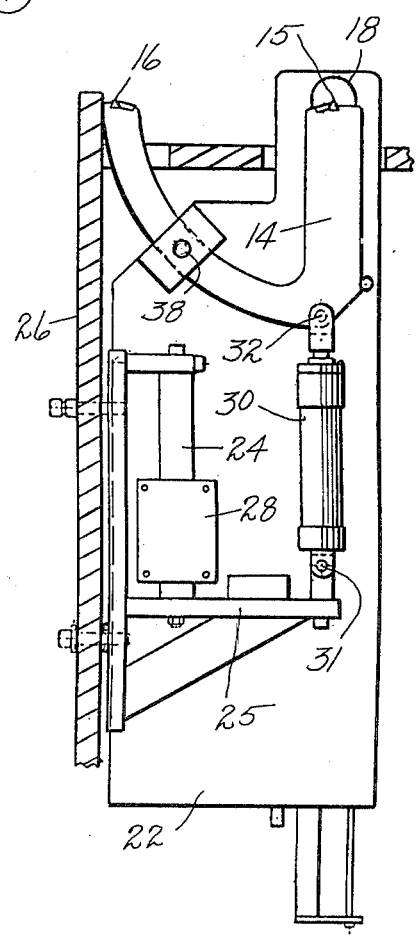

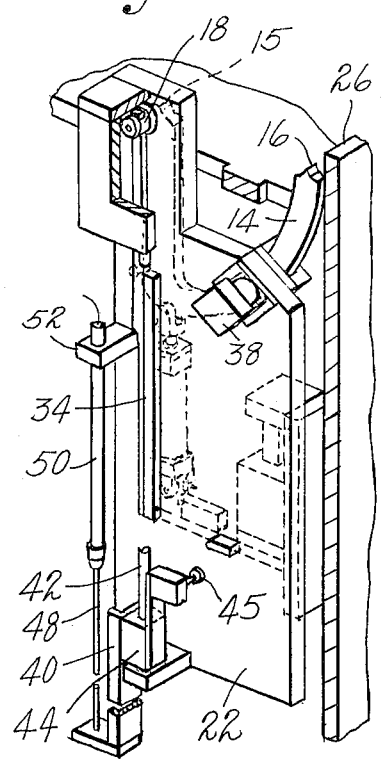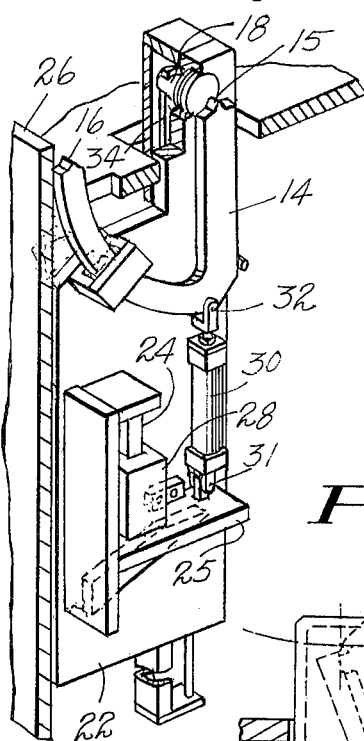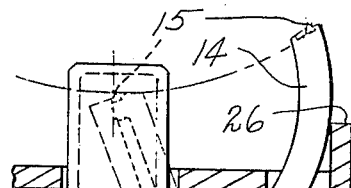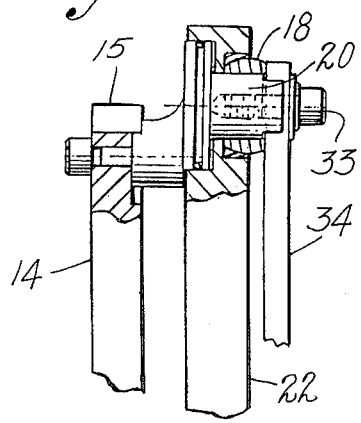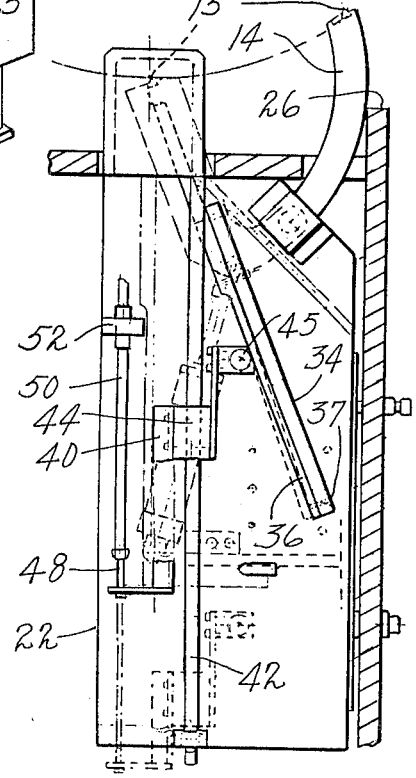

16 4,406,067

CENTERFINDING MACHINE

FIELD OF THE INVENTION

This invention relates to a gage for locating the center of circular workpieces which may vary in diameter by engaging one side of the periphery.

DESCRIPTION OF THE PRIOR ART

It is common to locate the center of circular workpieces by measuring the diameter with calipers which diametrically span the workpieces. When the diameter is determined, the center obviously is located at one half the diameter. This procedure is a simple matter when the workpieces are of relatively small or moderate diameters and is possible only when opposite ends of the diameter of the workpiece are accessible. However, for large or cumbersome circular parts such as railroad wheels, both sides of the workpiece usually are not easily accessible especially when located in a machine.

A use for such center determination is to align the axis of a workpiece with the axis of a rotary support in a machine such as the centers or chucks of a lathe or grinder. In U.S. Pat. No.4,215,482 there is shown an indicator assembly for locating the axis of a cylindrical workpiece in a roll turning lathe to align the axes of the roll and the lathes. Use of the device whether of a single probe or a rocking double probe both operating deflection indicators indicate only misalignment of a roll axis and a lathe axis.

U.S. Pat. No. 3,525,158 discloses apparatus for aligning the axis of a cylindrical workpiece with the axis of a reference shaft. As therein shown, indicator gages on extensions are strapped on the workpiece to indicate deviation of the periphery of the workpiece from the reference shaft. Use of such apparatus assumes that the diameters are already known.

U.S. Pat. No. 3,281,995 shows apparatus useful with a roll grinding machine for detecting misalignment of the axes of the roll and turning center of the machine. A yoke having roll contact points is moved down toward the roll journal until both contacts engage the journal causing movement of the yoke until its center coincides with the axis of the roll. Linear movement of the yoke from a reference thus indicates the extent of misalignment of the roll and machine axes to initiate corrective action.

SUMMARY OF THE INVENTION

The above patents are useful for detecting misalignments and/or indicating coincidence of work and machine axes for machine set up for example as in a lathe or grinder. The apparatus of the present invention measures the diameter of large circular workpieces and/or determines the extent of movement required to move a large circular workpiece so the center is substantially aligned with the axis of operating elements of the machine. Due to the size and weight of workpieces such as railroad wheels or large rolls it is desirable to engage the periphery of the wheel only from one side during a size measuring operation. To this end the wheel is located with the axis of the wheel axle in the vertical plane of the working elements of the machine. A gaging plate having two spaced probes is arranged to be moved so one of the probes is moved along that plane which extends through the axis of the wheel. After the one probe engages the periphery of the wheel, the plate rocks about the probe until the other probe also engages the periphery of the wheel. During such rocking movement, a bar is swung to an angular position, the extent of which depends on the extent of rocking of the probe plate. The arrangement is such that the plate is swung further for a smaller diameter wheel than for a larger diameter and the angular displacement of the bar is greater for the small diameter than the large. Thus, the angle of the bar from a staring point is proportionally indicative of wheel size and the location of the wheel center. By measuring the angle or moving an element along a path intercepting the bar the location of the center is determined.

DESCRIPTION OF THE DRAWINGS

FIG. 1 is a left-side elevation of a device embodying the invention for gaging large diameters of workpieces shown diagrammatically;

FIG. 2 is a view similar to FIG. 1 showing the parts in their starting positions;

FIG. 3 is a right side elevation of the parts shown in FIG. 1;

FIG. 4 is a perspective view of the parts shown in FIG. 1;

FIG. 5 is a perspective view of the parts shown in FIG. 3;

FIG. 6 is a view in an enlarged scale and partly in section showing the pivot bearing for the gage probe devices; and, FIG. 7 is a perspective view partly in section showing the device of the invention embodied in a typical machine associated with the gaging of railroad wheels.

DESCRIPTION OF THE PREFERRED EMBODIMENT

Figure 7:
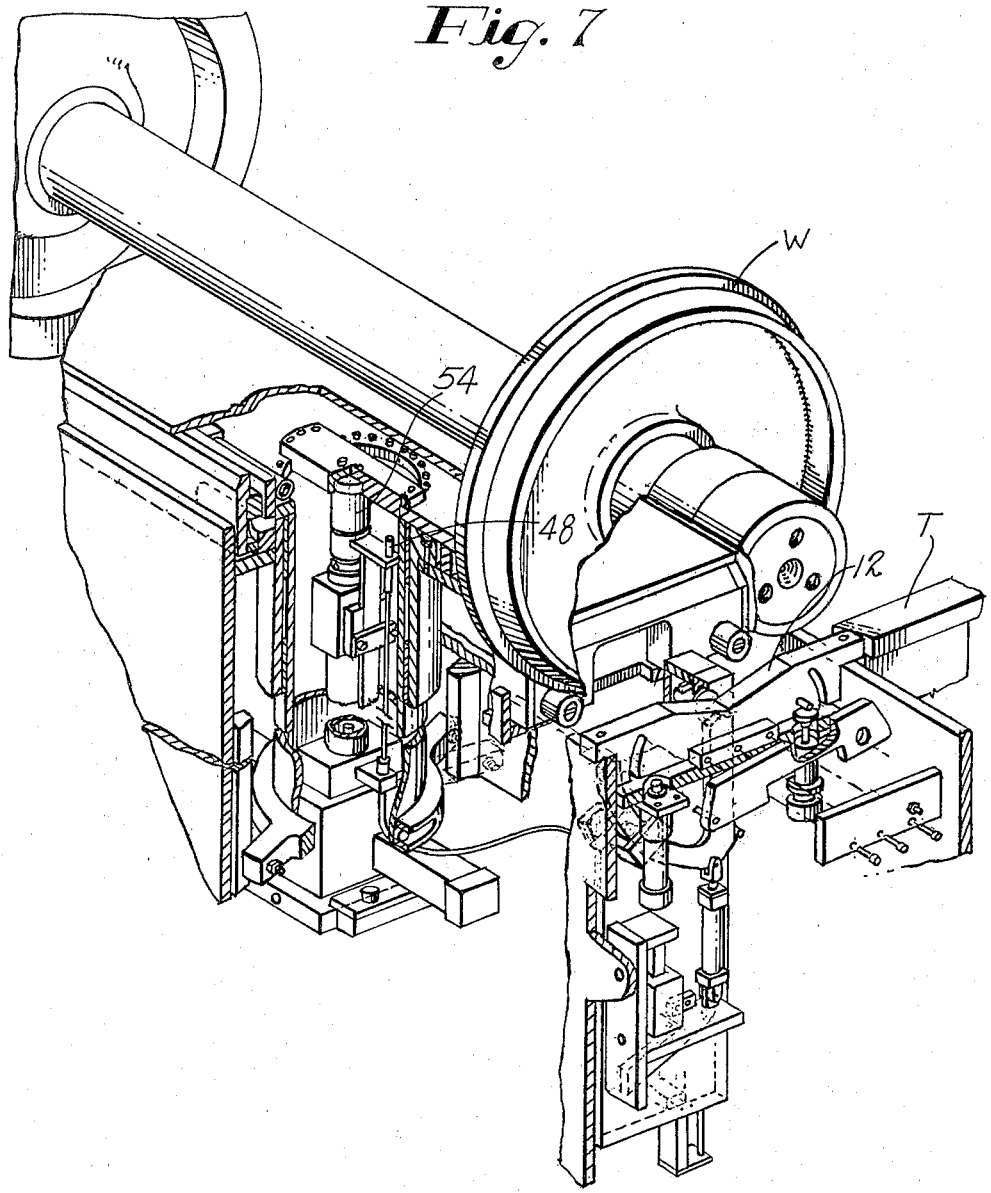

Referring to FIG. 1, there is seen a diagrammatic illustration of the relations of a variety of wheel diameters W, the location of the centers A thereof and the angular disposition of the gaging element embodying the invention. There is shown a gaging device adapted to measure the diameter of a large circular workpiece such as a railroad wheel W. The wheel is located along a track T (FIG. 7) by a V-shaped depression 12 in the track. A gaging plate 14 (FIGS. 1 and 2) is provided with two probes 15 and 16 and is mounted to pivot on a bearing 18 (FIG. 6) coaxial with the contact point of the primary probe 15. The plate 14 is mounted on a shaft 20 pivoted in the bearing 18 in a plate 22 mounted for heightwise reciprocation on a bar 24. The bar is carried by a bracket 25 secured to a frame 26 and receives a slide 28 fixed on the plate 22.

The gage plate 14 and its associated plate 22 are reciprocated heightwise by a cylinder 30 secured to the bracket 25 by a pin 31 and having a piston rod pivoted to the gage plate 14 by a pin 32. Operation of cylinder 30 moves the gage plate 14 heightwise until the probe 15 contacts the periphery of the wheel W. The probe 15 is thus moved heightwise along a radial plane which intersects the axis of wheel W. After contact of the probe 15, the gage plate 14 is swung on the shaft 20 by continued operation of cylinder 30 until the probe 16 also contacts the periphery of the wheel, as seen in FIG. 1, stopping further swinging movement of the gage plate. A lever 34 (FIGS. 3 and 6) is fixed by a bolt 33 on the end of the shaft 20 opposite the gage plate 14 and is swung in unison with the gage plate. A gage surface 36 formed on a bar 37 secured to the lever 34 is thus caused to assume a particular angular disposition which depends on the extent of swinging movement of the gage plate controlled by the size of the wheel W. Obviously, the gage surface could be formed on the gage plate rather than on a separate lever without departing from the scope of the invention. At this time a cylinder 38 is actuated and clamps the gage plate 14 from further movement relative to the plate 22 and thus locks the gage surface 36 in its angular disposition. Referring to FIG. 3, the angular disposition of surface 36 is diagrammatically shown to be indicative of the size of the wheel W.

A carriage 40 is adapted to slide heightwise along a bar 42 fixed at opposite ends to the plate 22 and carries a limit switch 44 having an actuator 45 adapted to contact the gage surface 36 as it is moved heightwise. The carriage 40 is secured to one end of a cable 48 encased in a sheath 50 secured at 52 to the plate 22. The other end of cable 48 may be secured to an elevator 54 (FIG. 7) so that movement of the elevator causes the carriage 40 to be moved heightwise simultaneously. Heightwise movement of the elevator 54 in the illustrative machine raises the wheel W until the limit switch actuator 45 contacts the gage surface 36 causing the heightwise movement of the elevator to stop. Thus, since the angular disposition of the gage surface is dependent on the size of the wheel (as determined by the contact of the probes 15 and 16 with the wheel periphery) the center of the wheel will be located at the desired location in a machine. For a detailed description of a typical workpiece elevator, reference may be had to copending U.S. application Ser. No. 426,835, filed Sept. 29, 1982, which is incorporated herein by reference.

Referring to FIG. 1 it may be seen that the wheel W (or other large cylindrical object) is supported on a pair of buttons 56 extending from one end of the elevator 54 (see also FIG. 7). It should be obvious that a smaller diameter workpiece will extend lower between the buttons than a larger workpiece. For this reason, initial heightwise movement of the gage before its probe 15 engages the periphery of the workpiece will be less for the small workpiece. Regardless of its angular disposition, the gage surface 36 would be disposed lower and would be engaged sooner by the switch actuator 45 providing a false control indication. For this reason, the bar 37 (FIG. 3) is fixed at its upper end to the lever 34 and is unsecured at its lower end but is engaged by an adjustment screw 58. By adjusting the screw 58 the bar 37 may be bent to provide a gaging surface shown in phantom line. Thus, the gaging surface 36 can be varied to suit errors which may occur due to the handling of different size workpieces.

While a preferred embodiment has been described suitable for gaging and handling railroad wheels, it should be obvious that the gage may take other forms without departing from the scope of the invention defined by the appended claims. It is an important element of the invention that the gage be disposed radially of the workpiece. In this way the gage pivots about the primary probe and is swung to engage the secondary probe with the workpiece periphery to an extent proportional to the size of the workpiece. Thus, the angular disposition of the gage surface is indicative of the workpiece size. Rather than controlling workpiece movement by the angular disposition of the gage surface controlling a switch, it is within the spirit of the invention to provide indicia related to the angular disposition for direct reading of the workpiece size. Also it is contemplated that the gage could be portable rather than be secured to a machine.

I claim:

1. A gage for determining the center location of circular workpieces comprising a support plate, a gage member disposed radially of the workpiece and pivoted on said plate, said gage member having a primary probe engageable with the workpiece periphery along a radial plane, a secondary probe on the member engageable with the periphery at a location spaced from the primary probe by swinging of the member about the contact point of the primary probe, the pivot axis being coaxial with the contact point of the primary probe, and a gage surface associated with the member and which assumes an angular disposition relative to said plane depending on the extent of swinging movement of the member required to engage both probes, said angular disposition of the surface being indicative of the distance between the periphery and the center of the workpiece.

2. A gage according to claim 1 in which the gage is associated with means for locating the center of the workpiece and the gage along the same radial plane.

3. A gage according to claim 2 in which the locating means includes a pair of buttons engaging the periphery and between which the workpiece is centered.

4. A gage according to claim 1 in which said plate is movable along said radial plane, the member and plate being moved by a cylinder which is also effective to swing the member to engage the secondary probe after engagement of the primary probe.

5. A gage according to claim 1 in which a lever having the gage surface is fixed to a shaft to which the member is secured and comprises the pivot axis.

6. A gage according to claims 4 or 5 in which a clamp is provided to fix the angular disposition of the member upon completion of its swinging movement.

7. A gage according to claims 4 or 5 in which an elevator is provided to move the workpiece along said radial plane and a switch controlling the movement of the elevator is mounted on the plate for movement with the elevator and relative to the gage surface whereby the elevator moves the workpiece until the switch is actuated by engagement with the gage surface to locate the center of the workpiece at a specific location.

* * * * *